United States Patent Office 2,972,636
Patented Feb. 21, 1961

2,972,636
SEPARATION OF MIXTURES OF HIGH MOLECULAR ALCOHOLS INTO COMPONENTS OF DIFFERENT MELTING POINTS

Helmut Hartmann and Werner Stein, Dusseldorf-Holthausen, Germany, assignors to Henkel & Cie., G.m.b.H., Dusseldorf-Holthausen, Germany, a German corporation No Drawing. Filed Mar. 3, 1954, Ser. No. 413,947

Claims priority, application Germany Mar. 17, 1953

11 Claims. (Cl. 260—643)

This invention relates to improvements in the separation of mixtures of high molecular alcohols into components of different melting points.

The term "high molecular alcohols" as used herein designates alcohols preferably of an aliphatic nature, which contain 8 to 30, and preferably 10 to 25 carbon atoms in the molecule. These high-molecular alcohols generally occur in nature in the form of their esters and may be produced synthetically by various methods. The naturally occurring esters of high-molecular alcohols include the so-called wax esters, which may either be of vegetable or animal origin. These esters, for example, may be obtained from beeswax and various marine animals. Montan wax is another source of these high-molecular alcohols. The alcohols are recovered from these natural esters by decomposition of the ester to form the alcohol.

These high-molecular alcohols may also be prepared from corresponding natural fatty acids or their esters by reduction. In this connection it is possible to merely reduce the carboxyl group and form a methanol group, or else to also hydrogenate any double bonds present in the molecule. These alcohols are frequently referred to as fatty alcohols.

High-molecular synthetic alcohols may be obtained, for example, by a modified carbon monoxide hydrogenation, in which connection the alcohols are obtained in addition to hydrocarbons. The alcohols may also be formed by the catalytic addition of carbon monoxide and hydrogen to olefins and reduction of the aldehydes formed to alcohols. The above-mentioned alcohols are generally primary alcohols. The oxidation of non-aromatic hydrocarbons will form the corresponding alcohols, which are, however, in part, secondary alcohols. A further source of completely synthetic alcohols are carboxylic acids obtained by the oxidation of non-aromatic hydrocarbons, which yield corresponding alcohols after reduction.

The above-mentioned higher-molecular alcohols are generally obtained as mixtures containing components of varying melting points. It is generally necessary to separate these mixtures into components of different melting points for further use.

One object of this invention is a new method for the separation of mixtures of such high-molecular alcohols into components of different melting points. This, and still further objects, will become apparent from the following description:

In accordance with the invention, mixtures of higher-molecular alcohols are separated into components of different melting points by dispersing the mixture in an aqueous medium at a temperature at which a portion of the mixture is solid and another portion is liquid, and separating the liquid portions in a specifically lighter fraction and the solid portions with the aqueous medium into a specifically heavier fraction by centrifuging in an imperforate type centrifuge.

It has been found that the mixtures of liquid and solid alcohols, when dispersed in the aqueous medium, will separate by the displacement of the liquid alcohols from the surface of the solid alcohols in the medium, thus forming a dispersion in which the solid and liquid alcohols are present, separated from each other and finally distributed in the aqueous medium. This dispersion can then be separated in an imperforate type centrifuge into a specifically lighter phase, consisting of liquid alcohols, and a specifically heavier phase consisting of a suspension of the solid alcohols in the aqueous medium.

The method in accordance with the invention is effected at temperatures at which solid and liquid components are present at the same time. Depending upon the temperature and the composition of the alcohol mixture being treated, the mixture may be in the form of a liquid with solid particles suspended therein, in the form of a paste or solid mass in which the liquid components contained therein can no longer be observed on the basis of the external appearance.

In order to carry out the new method, the alcohol mixture which is to be separated must be of such a nature that it is possible for the aqueous medium to displace the liquid components from the surface of the solid components.

If the alcohol mixture is present in the form of a liquid with solid components suspended therein or in the form of a paste, it can be directly dispersed in the aqueous medium. It is frequently advisable to comminute the mixture which is to be separated before the dispersion. This can be done by mechanical treatment, for example, by the forcing through sieves, working in agitating or rolling mills, emulsifiers, hammer mills, pin disc mills, beater mills, gear mills, beater disc mills or other suitable grinding and cutting tools or comminuting apparatus.

The comminuting of the mixture can be eliminated if the molten mixture is cooled with continuous agitation. For the continuous effecting of the method, scraper coolers are suitable in connection with which the liquid alcohol mixture is conducted through an externally cooled pipe. The production of a wall coating is prevented by moving scrapers. In this connection there is obtained a mixture in which the solid particles are extremely finely divided in the liquid particles.

It may be advantageous to add liquid organic compounds to the aqueous medium, the alcohol mixtures or the dispersion at some stage of the process. As liquid organic compounds, there are suitable water-soluble and water-insoluble organic solvents which will not react with the alcohols, such as, for example, hydrocarbons, substituted hydrocarbons, alcohols, ketones, esters, carboxylic acids, etc. There are preferably used substances which, on the basis of their physical properties, such as solubility or boiling point, can be easily removed again from the alcohols obtained. In particular, the liquid alcohols obtained from the process are suitable for use as addition liquids.

By varying the operating conditions, such as the nature and manner of the cooling, the separating temperature, the nature and quantity of the liquid organic compounds or their mixtures added, both the consistency of the mixture to be separated and the composition of the solid and liquid components can be influenced. The liquid organic compounds may also be added during the working of the alcohol mixture, as, for example, during the comminuting, or when treating with the aqueous medium.

As already stated, the method of the present invention is based on the displacement of the liquid alcohols from the surface of the solid alcohols by aqueous media; these media may contain surface-active substances, liquid water-soluble organic compounds, electrolytes, and colloids in any desired combination, it also being possible to add the surface-active materials to the alcohol mixture before the latter is dispersed in the aqueous medium.

By surface-active substances, a large number of which of the most varied types are known, there are understood organic compounds which contain hydrophobic and hydrophilic groups in the molecule, and, when added to the system, reduce the interfacial tension between alcohol and aqueous medium. Such compounds contain non-aromatic hydrocarbon radicals having 8 to 20, and preferably 12 to 18 carbon atoms and salt-forming or non-salt-forming water-solubilizing groups. As examples of surface-active materials having acid, water-solubilizing groups, there may be mentioned alkyl benzol sulfonates, alcohol sulfates, alkyl sulfonates, sulfated fatty acid monoglycerides and soaps, including in particular soaps of organic bases such as mono-, di-, or triethanolamine. Surface-active substances having basic water-solubilizing groups are known as cation-active compounds. Of special importance are substances of this type containing quarternary nitrogen atoms, for example, the alkylpyridinium salts. As examples of surface-active materials having a non-salt-forming water-solubilizing group, there may be mentioned alkylene oxide addition products to high-molecular compounds having a mobile hydrogen atom, for example, the polyglycol ethers of aliphatic alcohols or alkyl phenols, as well as polyglycol esters of fatty acids. Such substances also include compounds having a plurality of solubilizing hydroxyl groups in the molecule, such as partial ethers of high alcohols or partial esters of fatty acids with polyvalent alcohols or their internal or external etherification products. Known emulsifying agents of this type are the fatty monoglycerides and the fatty acid esters of sorbite or its internal ethers.

The concentration of the surface-active material in the solution can vary within wide limits, from about 0.1 to 5%.

The wetting of the solid alcohols by the aqueous medium may also be controlled by the addition of electrolytes. Electrolytes are frequently present in industrial surface-active materials in the form of sodium sulfate or sodium chloride. Furthermore, other salts, such as magnesium salts, are suitable as additions. The action of the electrolyte addition to the state of solution of the surface-active material is, however, not limited to specific cations, such as alkalis or alkali earths, nor to specific anions, such as chlorides, sulfates, or nitrates. There may also be of importance electrolytes which prevent the corrosion of metallic materials, for example, nitrites and salts of such acids of phosphorus, which contain less water of constitution than orthophosphoric acid, as well as any desired mixtures of such electrolytes.

Protective colloids may also be added within the scope of the invention to the aqueous phase. Protective colloids are inorganic or organic, water-soluble, swellable, or insoluble substances, which are able to influence the state of emulsion. Inorganic protective colloids consist of a large number of mucilaginous or flocculent precipitates, which frequently remain suspended in colloidal form in water or only settle out slowly. Completely water-soluble compounds, for example, salts of polymeric phosphoric acids, are also suitable for the purpose of the invention. Organic protective colloids can be of natural or synthetic origin. Organic protective colloids of natural origin are, for example, glue, gelatine, or other albumins, gum tragacanth, pectins, alginates, etc. Among protective colloids of synthetic origin, there may be mentioned high-molecular, liquid or wax-like polyglycol ethers, polyacrylates, cellulose glycolates, methylcelluloses, etc. The properties of the colloids can be influenced by the number of water-solubilizing groups present in the molecule and by any non-hydrophilic, functional groups possibly present. As examples, there may be mentioned copolymers of methacrylic acid and methacrylates, as well as ethoxycelluloseglycolates. The concentration of the protective colloids in the aqueous medium can vary between 0 and 7%, being preferably between 0.1 and 3%.

It may be necessary to effect the separation of the alcohol mixtures at temperatures below 0° C. In such cases, substances which lower the freezing point must be added to the aqueous medium. Inorganic electrolytes are suitable for this purpose to a limited extent. There may furthermore be used for this purpose polyvalent alcohols or their water-soluble derivatives, such as ethylene glycol, glycerol, polyglycerols, polyglycols or their partial ethers.

The quantity of aqueous medium in general amounts to 0.5 to 5 times the quantity of the alcohol mixture, but in special cases quantity ratios different from this may also be used. In the preparation of the dispersion, the quantity of aqueous medium may first of all be smaller, i.e., it can amount to 0.2 to 1 times the quantity of the alcohol mixture; thereupon by the addition of further aqueous medium, it is diluted to the desired quantity ratio. Substances dissolved in the aqueous medium, such as surface-active substances, colloidal substances, electrolytes, etc., can also be present in the desired concentration in the total quantity of aqueous medium, i.e., the small quantity of aqueous medium first used has the same concentration as the aqueous medium added for the dilution. However, it is also possible to proceed in such a manner that the smaller quantity of aqueous medium first used contains the dissolved substances in higher concentration. In this case, dilution is effected with aqueous medium of lower concentration or with water alone.

The alcohol mixtures to be separated can be shaken, stirred, or otherwise brought into intimate contact with the aqueous media. It is frequently possible to effect the mechanical working of the alcohol mixtures, the possible addition of liquid organic compounds, and the treatment with the aqueous media in one operation. A further modification of this method consists in adding the aqueous medium to the molten mixture of the alcohols to be separated, and cooling the mixture with mechanical treatment. In this manner, the solid alcohols can be obtained in a particularly fine state of division, so that subsequent comminution may be unnecessary. If such comminution, however, is necessary, there can be used for it any apparatus already mentioned for the comminution and homogenizing of the alcohol mixtures.

By preliminary tests, it is easy to determine the optimum quantities of surface-active materials, electrolytes, colloids and liquid, water-soluble organic compounds, as well as the fineness of the comminution and the manner of treatment with aqueous media, as well as the separating temperature.

The function of the aqueous medium is to wet the surface of the solid alcohol constituents and to displace the liquid alcohols adhering thereto from the surface, there being formed in this connection a dispersion of separated liquid and solid constituents in the aqueous phase. It is possible to easily break the dispersion in a centrifuge. The wetting and emulsifying of the constituents of the alcohol mixture by the aqueous phase is influenced by the nature of the alcohol mixture, the nature and quantity of the surface-active materials selected, and by the water-soluble organic compounds, electrolytes and colloids possibly added. The optimum working conditions which should be maintained in special cases can easily be determined by preliminary tests. The separation of the dispersion into liquid alcohols and solid alcohols suspended in the aqueous medium is effected by centrifuging. The method can be carried out continuously if the liquid alcohols on the one hand and the aqueous medium with the crystals of solid alcohols suspended therein on the other hand are removed separately in imperforate centrifuges.

In an imperforated type centrifuge, the liquid is rotated and thus subjected to centrifugal force in an outwardly confined zone. The outwardly confined zone, in which the liquid is rotated, is, for example, defined by a solid wall liquid impermeable centrifuge drum or basket. The centrifugal action in the outwardly confined zone causes the formation of two layers, i.e., an outwardly disposed layer of heavier specific gravity and an inner layer of lighter specific gravity. The specifically heavier layer consists of the aqueous medium with the solid alcohol suspended therein and the specifically lighter layer consists of the liquid alcohol portions. The two layers are then separately recovered. In a continuously operating imperforate type centrifuge the heavier outer and lighter inner layers are continuously removed, as, for example, by passing over separate overflow lips, or by separate stripping or pairing discs. In the operation of the imperforate type centrifuge, as contrasted to a perforate type centrifuge, the solid phase is not retained on a screen or filter, and therefore the use of filters of any type whatsoever is avoided, thus avoiding all filtration difficulties.

The solid constituents present in the aqueous medium can easily be removed by heating, and the aqueous phase obtained can be recycled. Insofar as addition substances which are soluble in alcohol have been used, they may also be recovered in a suitable manner from the solid and liquid alcohols obtained.

The melting and solidification points, respectively, of the solid and liquid alcohols are dependent on the temperature at which the separation was carried out and can be varied by changing the said temperature.

The solid or liquid alcohols can be again treated in the manner of the invention. The solid alcohols being worked at a higher temperature, and the liquid alcohols at a lower temperature. In this way there is obtained an extensive melting point fractionation of the products, intermediate fractions being returned to the starting material.

In the following examples, which describe the separation of alcohol mixtures of different degrees of saturation, the iodine number of the alcohol mixtures is given for identification instead of the solidification point. This has been done, since, on the one hand, the solidification point is dependent on the degree of saturation, and, on the other hand, the iodine number indicates different separating effects more sensitively than does the solidification point.

*Example 1*

As starting material, there was used a mixture of high-molecular alcohols ( B.P.=175–205° C./10 mm. mercury; iodine number=53), which had been prepared by the saponification of sperm oil with the removal of the fatty alcohols thus produced and subsequent distallation. 200 gram portions of this alcohol mixture were cooled with agitation within a period of a few hours from +30° C. to +20° C. with the same quantity of different aqueous media. As a result of this, depending on the nature of the aqueous media, there were obtained more or less fine dispersions of the alcohol mixture in the aqueous media, varying from thinly liquid to paste form. These dispersions were then poured into centrifuge tubes and separated by centrifuging into an upper phase consisting of the liquid portions of the alcohol mixture and a lower phase consisting of the aqueous medium in which the solid portions were melted and were in this way recovered, possibly after washing with water. In the following table, there are set forth the iodine numbers of the solid portions obtained when working with different aqueous media.

The liquid portions separated as the upper phase in the centrifuging had iodine numbers between 70 and 73. The dispersions to be separated, which contained surface-active substances or methyl alcohol, were more thinly liquid than dispersions containing only colloids or electrolytes, which, in turn, were more thinly liquid than dispersions which did not contain electrolytes.

| Aqueous Medium Containing | Iodine Number of the Solid Portions |
|---|---|
| No additions | 29 |
| 5% MgSO₄ | 28 |
| 0.1% sodium salt of an aliphatic alcohol sulfate C₁₂–C₁₄+0.1% sodium sulfate+5% MgSO₄ | 25 |
| 0.2% sodium salt of an aliphatic alcohol sulfate C₁₂–C₁₄+0.2% sodium sulfate+15% NaCl | 26 |
| 0.5% coconut oil alcohol-polyglycol ether with about 9 glycol ether radicals | 22 |
| 1.0+ dodecyl-benzyl-diethyl-ammonium chloride | 17 |
| 0.1% dodecyl-benzyl-diethyl-ammonium chloride+5% MgSO₄ | 17 |
| 0.5% lauryl pyridinium sulfate+5% MgSO₄ | 22 |
| 15% methyl alcohol | 20 |
| 0.5% sodium cellulose glycolate | 20 |
| 1.5% 30% sodium alkyl sulfonate (from reaction products of alkyl hydrocarbons with SO₂ and Cl₂)+5% MgSO₄ | 17 |
| 0.5% alginate+5% MgSO₄ | 18 |
| 0.1% of the aqueous medium of dodecyl-benzyl-diethyl-ammonium chloride added to the alcohol mixture+5% MgSO₄ in the aqueous medium | 18 |

*Example 2*

A portion of the alcohol mixture used in Example 1 was cooled with agitation within a few hours from +30 to +20° C. Another portion was cooled without motion into a semi-solid mass, whereupon the same was comminuted in a rapidly rotating cutter. In both cases the alcohol mixture had assumed a pasty, but still flowable, consistency. 200 gram portions of the mixtures prepared in this manner were stirred at +20° C. with 200 grams each of different solutions for 10 minutes, and the dispersions produced were separated and further worked in accordance with Example 1.

| Aqueous Media Containing— | Iodine Number of the Solid Portions Separated | |
|---|---|---|
| | Alcohol cooled with Agitation | Alcohol Cooled Without Agitation then Comminuted in the Cutter |
| 0.5% dodecyl-benzyl-diethylammonium chloride | 33 | |
| 0.5% dodecyl-benzyl-diethylammonium chloride+5% MgSO₄ | 27 | 33 |
| 0.5% dodecyl-benzyl-diethylammonium chloride+5% NaCl | 31 | |

The iodine number of the liquid portion was 70 to 72.

*Example 3*

1 kilogram of alcohol (iodine number=56) obtained by the dissociation of sperm oil was cooled with agitation over a period of a few hours from +30° C. to +20° C. with the same quantity of an aqueous solution which contained 0.5% dodecyl-benzyl-diethyl-ammonium chloride and 5% MgSO₄, whereupon the liquid dispersion produced was separated in accordance with Example 1 in a tube centrifuge. There separated as upper layer 0.73 kilogram liquid alcohols (iodine number=71), while by heating the aqueous layer there were obtained 0.27 kilogram of solid alcohols (iodine number=16).

0.5 kilogram of the alcohols obtained which were liquid at 20° C. were in their turn cooled with agitation over a period of a few hours from +20° C. to +10° C. with the same quantity of the above-described aqueous solution, and the dispersion obtained was separated by the centrifuge and further worked in the manner previously described.

0.29 kilogram liquid alcohols (iodine number =79) and 0.20 kilogram solid alcohols (iodine number =59) were obtained. The solid portions obtained in connection with the separation at 10° C. could be combined with the starting material and again separated.

*Example 4*

200 grams of a mixture of higher-molecular alcohols (iodine number =0) at a temperature of +30° C., which had been prepared by catalytic hydrogenation of a methyl ester of coconut oil acid, were slowly cooled together with the same quantity of water (3° C. per hour) with agitation. Already at +25° C. solid portions crystallized from the emulsion which was formed. At +21° C. 1% dodecyl-benzyl-diethyl-ammonium chloride and 10% $MgSO_4$ (referred to the water) were added to the mixture, which was now pasty. The dispersion, which was thinly liquid after solution of the added materials, was separated in a tube centrifuge and worked up in accordance with Example 1. There were obtained:

144 grams liquid portions having a solidification point of 17.8° C., and 52 grams solid portions having a solidification point of 26.1° C.

*Example 5*

150 grams of a mixture of high-molecular alcohols (chain length $C_{12}$–$C_{18}$, iodine number =0, solidification point =22.3° C.), which had been prepared by catalytic hydrogenation of synthetic fatty acid from paraffin oxidation, were cooled together with 100 grams 2.5% chromium sulfate solution, with agitation over the course of 1.5 hours from +30° C. to +18° C. The pasty dispersion produced was separated in a tube centrifuged and worked up in accordance with Example 1. There were obtained:

91 grams liquid portions having a solidification point of 14.6° C., and 55 grams solid portions having a solidification point of 28.6° C.

*Example 6*

200 grams of a synthetic alcohol (chain length $C_{15}$, iodine number =0.6, hydroxyl number =248, solidification point =16.6° C.) obtained from the oxo-synthesis were cooled together with the same quantity of a 5% magnesium sulfate solution over the course of 4 hours with agitation from +30° C. to +10° C. and the paste dispersion produced was then separated in a tube centrifuge and further worked in accordance with Example 1. There were obtained:

118 grams liquid portions (hydroxyl number =248, solidification point 7.7° C.), and 80 grams solid portions (hydroxyl number =250, solidification point 25.7° C.)

*Example 7*

100 kilograms of the sperm oil alcohol mixture used in Example 1 were cooled with 100 kilograms of an aqueous solution, which contains 0.5% dodecyl-benzyl-diethyl-ammonium chloride and 5% $MgSO_4$, over the course of 2½ hours with agitation from +30° to +20° C., and the dispersion obtained was diluted with 100 kilograms of water of a temperature of 20° C. These 300 kilograms of dispersion were separated by continuously operating solid-jacket centrifuge provided with stripping or paring discs. (through-put: 1.1 kilograms dispersion per minute). One stripping disc tube discharged the liquid alcohols as lighter component, while the other stripping disc tube discharged the aqueous phase with the solid alcohols suspended therein. By heating the aqueous phase, it was possible to separate the solid alcohol. 150 kilograms dispersion gave in this connection 32 kilograms liquid alcohols (iodine number =72) and 17 kilograms of solid alcohols (iodine number =20).

The term "electrolyte" when used throughout the specification designates electrolytes, preferably salts, having no capillary active properties. The concentration of the electrolytes in the aqueous medium may range up to 20% by weight.

Among the protective colloids, those containing salt forming hydrophilic groups are the most important ones.

The separation of the solid alcohols from the aqueous medium is easily performed by heating the aqueous medium with the suspension of the solid alcohols to above the melting point of the solid alcohols, thus forming two layers, i.e., an upper oily layer and a lower aqueous layer, which may then be separately recovered.

All the additives, such as the surface-active materials, the electrolytes, colloids, etc., must be inert toward the alcohols.

We claim:

1. Method for the separation of mixtures of high-molecular alcohols into components of different melting points, which comprises finely dispersing such a mixture in an aqueous medium at a temperature at which the mixture contains both solid and liquid constituents, and thereafter subjecting the aqueous dispersion to centrifugal action in an outwardly liquid-impermeable confined zone passing a separated specifically lighter phase of substantially liquid alcohols out of said zone and separately passing a specifically heavier phase of aqueous medium with substantially solid alcohols suspended therein out of said zone.

2. Method according to claim 1, in which said aqueous dispersion contains a surface-active material.

3. Method according to claim 2, in which said surface-active material is present in a concentration of about 0.2 to 5%.

4. Method according to claim 1, in which said aqueous dispersion contains an electrolyte.

5. Method according to claim 1, in which said aqueous dispersion contains a protective colloid.

6. Method according to claim 5, in which said protective colloid is present in amount up to 7%.

7. Method according to claim 1, in which said aqueous dispersion contains a freezing point depressant for the aqueous medium.

8. Method according to claim 1, in which said aqueous medium is present in amount of about 0.5 to five times the quantity of the mixture of alcohols.

9. Method according to claim 1, in which said aqueous dispersion contains a surface-active material in electrolyte and a protective colloid.

10. Method according to claim 1, in which the alcohols from the specifically lighter phase are recovered and subjected to a second separation treatment in accordance with the steps of the method.

11. Method according to claim 1, in which the alcohols from the specifically heavier phase are recovered and subjected to a second separation treatment in accordance with the steps of the method.

References Cited in the file of this patent

UNITED STATES PATENTS

| 2,029,261 | Ginn | Jan. 28, 1936 |
| 2,092,797 | Carr | Sept. 14, 1937 |
| 2,113,960 | Grote et al. | Apr. 12, 1938 |
| 2,296,456 | Schutte | Sept. 22, 1942 |
| 2,296,457 | Schutte | Sept. 22, 1942 |
| 2,296,458 | Schutte | Sept. 22, 1942 |
| 2,296,459 | Schutte | Sept. 22, 1942 |
| 2,579,257 | Hansley et al. | Dec. 18, 1951 |

OTHER REFERENCES

Golding: Technique of Organic Chemistry, vol. III, "Centrifuging," Interscience, N.Y., 1950; pages 143, 148–52, 158.

Lucas et al.: "Principles and Practice in Organic Chemistry," Wiley and Sons, N.Y., 1949; page 79.

McBain: Colloid Science, 1950, pages 22 to 24.